(12) United States Patent
Hill et al.

(10) Patent No.: US 7,614,646 B2
(45) Date of Patent: Nov. 10, 2009

(54) INFLATABLE CURTAIN AIRBAGS

(75) Inventors: Christopher Stephen Hill, Stockton (GB); Andrew Philip Lockwood, Daventry (GB)

(73) Assignee: Jaguar Cars Limited, Whitley, Coventry (GB)

( * ) Notice: Subject to any disclaimer, the term of this patent is extended or adjusted under 35 U.S.C. 154(b) by 0 days.

(21) Appl. No.: 12/197,552

(22) Filed: Aug. 25, 2008

(65) Prior Publication Data

US 2009/0051145 A1 Feb. 26, 2009

(30) Foreign Application Priority Data

Aug. 24, 2007 (GB) ................... 0716506.1

(51) Int. Cl.
*B60R 21/16* (2006.01)
(52) U.S. Cl. ................... 280/728.2
(58) Field of Classification Search ........... 280/728.2, 280/729, 730.2, 749
See application file for complete search history.

(56) References Cited

U.S. PATENT DOCUMENTS

| 5,004,266 | A |   | 4/1991 | Miller et al. |
| 5,765,867 | A | * | 6/1998 | French .................... 280/743.2 |
| 6,070,904 | A | * | 6/2000 | Ozaki et al. .............. 280/743.1 |
| 6,099,028 | A | * | 8/2000 | Seifert ..................... 280/728.3 |
| 6,585,292 | B2 | * | 7/2003 | Abe et al. ................ 280/743.1 |
| 6,883,831 | B2 | * | 4/2005 | Hawthorn et al. ........... 280/739 |
| 6,889,999 | B2 | * | 5/2005 | Dominissini et al. ..... 280/730.2 |
| 2002/0163169 | A1 | * | 11/2002 | Fischer .................... 280/730.2 |
| 2003/0178832 | A1 | * | 9/2003 | Dominissini et al. ..... 280/743.2 |
| 2005/0179238 | A1 | * | 8/2005 | Kippschull et al. ....... 280/728.2 |
| 2006/0192368 | A1 | * | 8/2006 | Hall et al. ................ 280/730.2 |
| 2007/0090630 | A1 | * | 4/2007 | Wilmot ................... 280/728.2 |

FOREIGN PATENT DOCUMENTS

DE 297 12 437 U1 7/1997
WO 97/06984 A1 2/1997

* cited by examiner

*Primary Examiner*—Paul N Dickson
*Assistant Examiner*—Robert A Coker
(74) *Attorney, Agent, or Firm*—Brooks Kushman P.C.

(57) ABSTRACT

An inflatable airbag system for a motor vehicle includes a restraining strap for delaying inflation of a central portion of an airbag and deflecting gas into adjacent elongate portions in the initial stages of deployment.

20 Claims, 3 Drawing Sheets

INFLATABLE CURTAIN AIRBAGS

BACKGROUND OF THE INVENTION

1. Field of the Invention

This invention relates to an inflatable airbag system for a motor vehicle.

2. Background Art

Motor vehicle airbags, including inflatable curtain airbags may include a central inflatable portion connectable to an inflator for providing the necessary gas supply. These side curtain airbags is to prevent an occupant's head from coming into contact with the vehicle's window glass or any intruding object. The curtain airbag may be located in a structural portion of the vehicle sometimes referred to as the motor vehicle's "B" pillar. Two elongate inflatable portions extending either side of the central portion of the airbag are trained along the side roof rail of the vehicle. The airbag is packed into a frangible cover and located behind a headliner or trim panel.

On deployment of such an airbag, initially, the central portion tends to the "balloon out" and then subsequently, the elongate portions commence to inflate as the gas moves outwards from the central portion. It has been found that if an occupant's head is close to or resting against the side window or side trim of the vehicle when the airbag deploys, then as it commences to inflate, there is a tendency for the airbag to wrap a part of itself around the inboard side of the head and to push it further against the window glass.

SUMMARY OF THE INVENTION

Embodiments of the invention may take the form of an airbag system for a vehicle. The airbag may comprise a central inflatable portion including an inflator for producing inflating gas on deployment of the airbag, one or more inflatable elongate portions extending either side of said central inflatable portion, and a frangible restraining strap secured around the central inflatable portion, whereby on deployment of the airbag, the frangible restraining strap delays inflation of the central portion by deflecting the inflatable gas into the elongate portions.

DETAILED DESCRIPTION OF THE PREFERRED EMBODIMENT(S)

As required, detailed embodiments of the present invention are disclosed herein. However, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
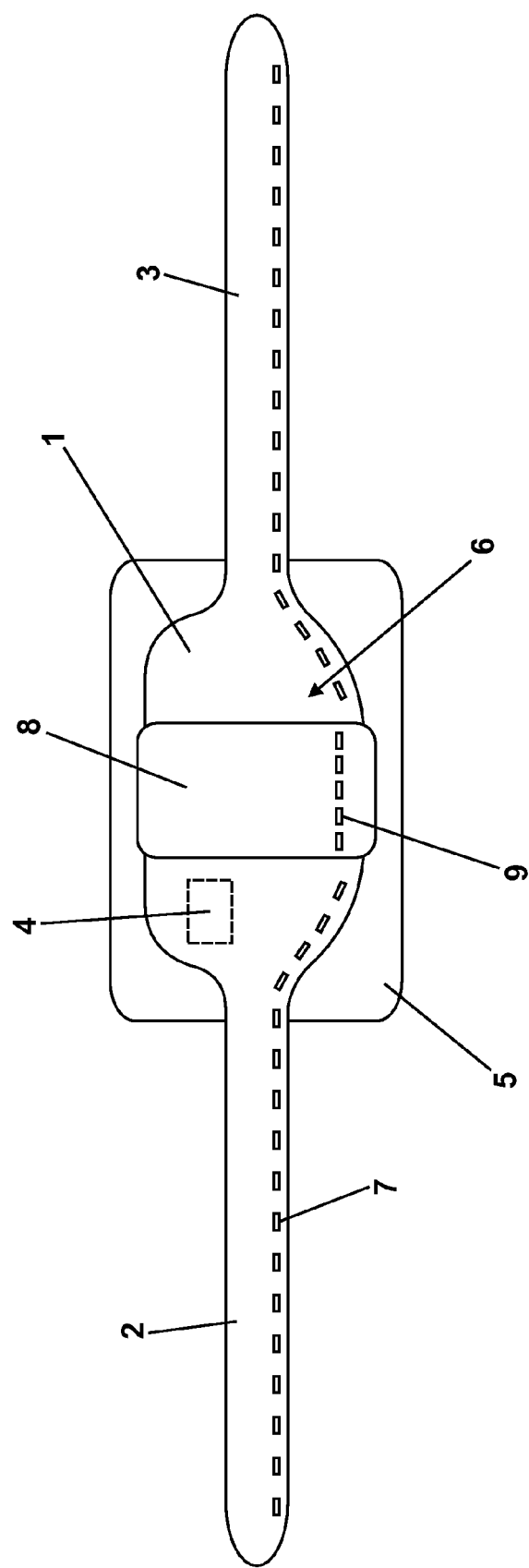
FIG. 1 is a schematic diagram of an embodiment of an inflatable curtain airbag of an airbag system for a motor vehicle.

With reference now to the Figures, an airbag system for a motor vehicle is illustrated in accordance with the present invention. FIG. 1 illustrates an inflatable curtain airbag suitable for use in a motor vehicle may include a central inflatable portion 1 and one or more inflatable elongate portions. As illustrated in FIG. 1, the airbag includes a pair of inflatable elongate portions 2, 3 extending generally adjacent either side of the central portion 1. An inflator 4 for providing an inflator gas to the airbag may be provided in communication with the airbag. As illustrated in FIG. 1, inflator 4 (shown ghosted) may be included within the central portion 1. It is understood that inflator 4 may be disposed in another portion of the airbag or in the motor vehicle and to accomplish the same objective.

The central inflatable portion 1 of the airbag may be secured to a mounting bracket 5. The mounting bracket 5 may be affixed to an upper region of the "B" pillar portion of the motor vehicle. Alternatively, the mounting bracket 5 may be affixed to another portion of the motor vehicle to accomplish the same objective. When the airbag is fitted to a vehicle, the elongate portions 2, 3 may be trained along the roof rail of the vehicle above the front and rear side windows and the airbag and bracket assembly are hidden behind the vehicle's headliner and "B" pillar trim.

Figure 2:
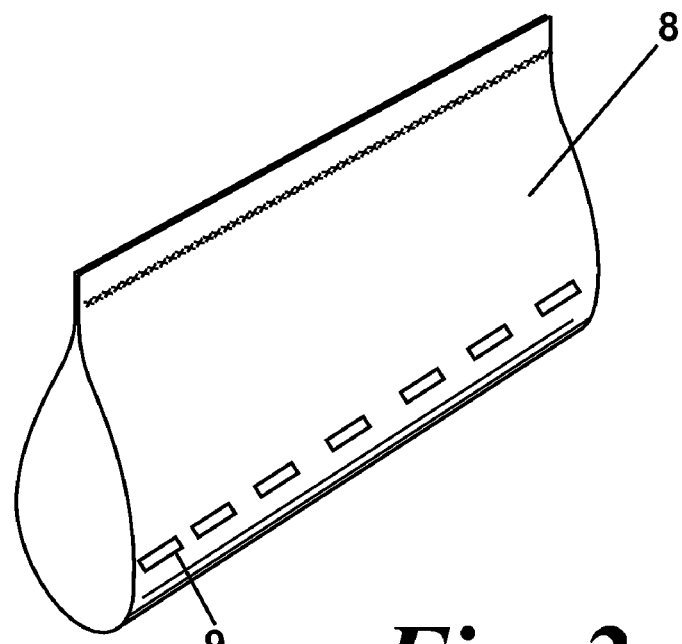
FIG. 2 is a perspective view of an embodiment of a frangible restraining strap for use in connection with the airbag system.

A frangible fabric cover 6 encases the central portion 1 and elongate portions 2, 3 of the airbag. Perforations 7 may be formed along the length of the cover 6 to permit the cover to rupture during deployment of the airbag. Referring additionally now to FIG. 2, a frangible restraining strap 8 may cooperate with the airbag. The strap 8 may include at least one strip of polymeric or plastic tape whose ends are joined together to form a loop which is fitted snugly around the cover 6 adjacent the region of the central portion 1. The strap 8 may incorporate one or more perforations 9 to enable the strap to rupture under inflating gas pressure.

Operation of the embodiment of FIGS. 1 and 2 will now be described. In this specific example, the airbag of FIG. 1 may be installed in a motor vehicle passenger compartment adjacent a front passenger seating compartment. It is understood that the airbag system may be installed in other portions of the motor vehicle passenger compartment to accomplish the same objectives. In the illustrative example, a passenger in the front passenger seating compartment may have his head presented adjacent or resting against a side window with the back of his head close to the "B" pillar of the motor vehicle.

In the event an incident is detected by one or more motor vehicle systems cooperating with the airbag system, the airbag inflator 4 receives a signal an activates to provide an inflatable gas to the airbag. As the airbag is inflated, cover 6 may rupture, allowing the central portion 1 and elongate portions 2, 3 to inflate. Restraining strap 8 secured about the airbag cooperates with the central portion to prevent the central portion 1 from ballooning out in the initial deployment phase.

The inhibition of gas flow in the region of the central portion 1 up until the point at which the restraining strap 8 ruptures may allow the gas flow to deflect through to the elongate portions 2, 3. This creates a "leap frog" effect past the occupant's head, with a significant quantity of gas flowing into a region of the elongate portion 2 which is in front of his head. Consequently, forces are applied to the back and front of the occupant's head, tending to push it away from the window rather than towards it. In the later stages of deployment of the airbag system, the one or more perforations 9 of the restraining strap 8 fail, allowing the central portion 1 to continue expanding to deploy.

Figure 3:
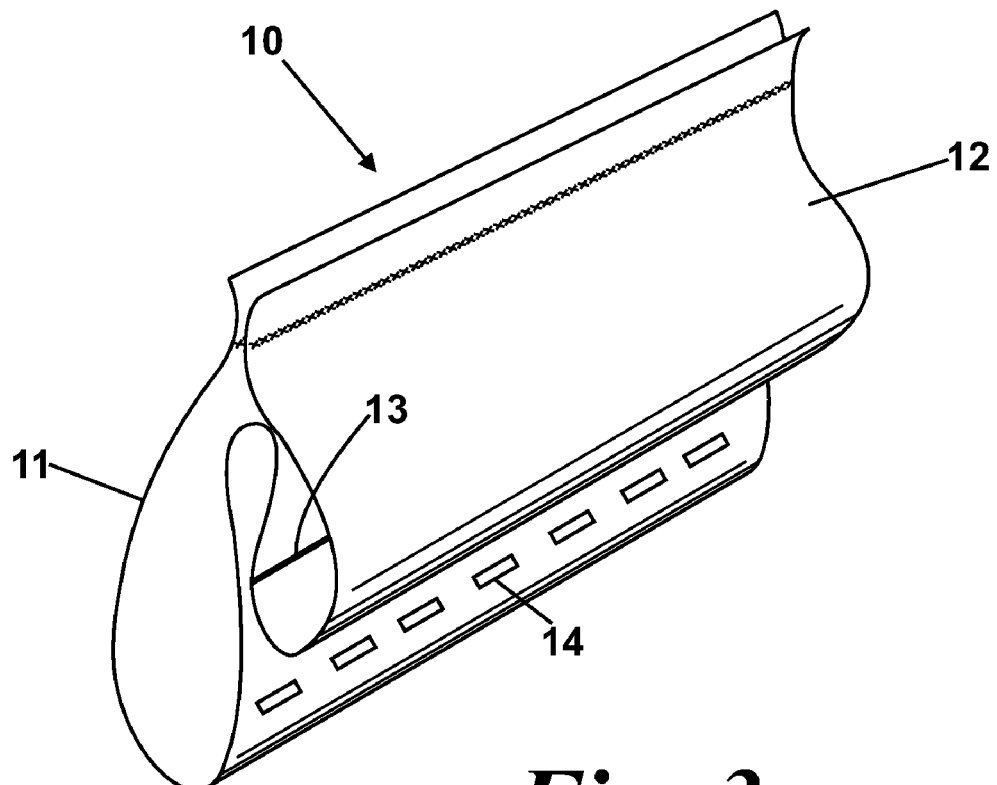
FIG. 3 is a perspective view of another embodiment of a frangible restraining strap for use in connection with the airbag system.

FIG. 3 illustrates another embodiment of the airbag system. Restraining strap 10 may include a loop of material having one or more folds 11, 12. One side of the first fold 11 may be attached to an adjacent side of a second fold 12 by way of a seam 13. The first fold 11 incorporates a series of perforations 14 across its width. This set of perforations 14 may be configured to have a greater strength than the seam 13. While such a standard is not required to be identified, it may be feasible that the perforations may be twice as strong as the seam. Implementation of this strap 10 permits a two-stage mode of deployment.

On initial deployment of the gas inflator, the strap 10 restricts inflation of the central portion 1 up to the point at which the seam 13 fails and the strap 10 opens out into an enlarged diameter loop. During this initial phase, gas flows past the occupant's head through the elongate portion 2 towards the front of the vehicle. Once the seam 13 fails, the enlarge loop forms a chute over the occupant's head. With this comparatively large amount of fabric containing gas at relatively low pressure, there is less of a tendency to grip the head than does the conventional airbag material, and, as such, less of a tendency for the head to be pushed outboard. As the gas pressure continues to build up, the perforations 14 fail and the strap no longer restricts the central portion's inflation.

Figure 4:
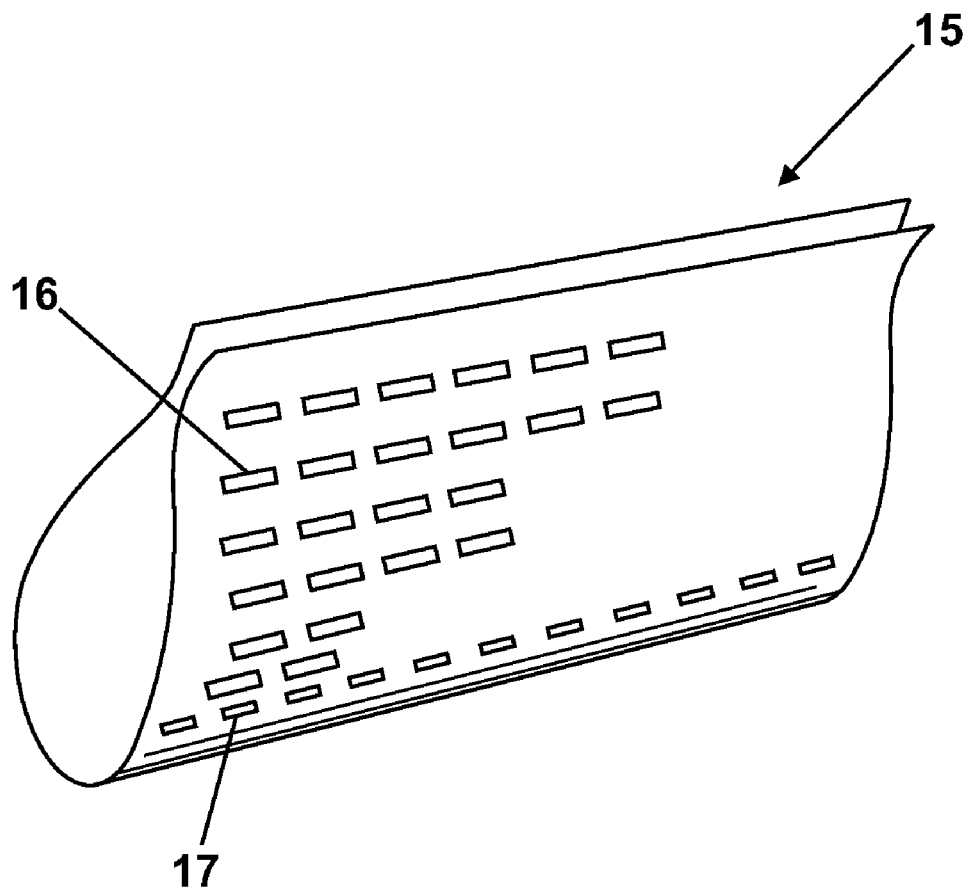
FIG. 4 is a perspective view of yet another embodiment of a frangible restraining strap for use in connection with the airbag system.

Referring now to FIG. 4, a further alternative form of restraining strap 15 comprises a loop of material provided with a plurality of rows of perforations which may include a lattice type pattern 16. In this example, the number of perforations increases along the width of the strap 15 in one preferred direction. This permits different amounts of expansion across the width of the strap 15 as the inflating gas moves from the central portion 1 into one of the elongate portions 2, 3.

For example, the perforations can be made increasingly more numerous in the direction of gas flow. This creates a path of least resistance during the initial phase of airbag deployment in order to bias the gas flow towards the front of the head of a front seat occupant. i.e. the strap 15 stretches more at its end which is most distant from the source of gas flow, thereby allowing more gas to get in front of the occupant's head. An additional series of perforations 17 across the width of the strap 15 is also provided in order to permit the strap to eventually rupture, thus allowing full expansion of the central portion.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A curtain airbag comprising:
   a central inflatable portion in communication with an inflator for producing inflating gas on deployment of the airbag;
   at least one inflatable elongate portion extending adjacent said central inflatable portion, the at least one elongate portion having a diameter less than a diameter of the central inflatable portion; and
   a frangible restraining strap secured around the central inflatable portion, the frangible restraining strap having one or more perforations formed therein whereby on deployment of the airbag, the frangible restraining strap delays inflation of the central portion by deflecting the inflating gas into the at least one elongate portion.

2. The curtain airbag of claim 1 wherein the frangible restraining strap comprises a plurality of rows of perforations, wherein at least some of the rows are configured with the number of perforations from one row to the next increasing in number to allow greater amounts of expansion in one preferred direction.

3. The curtain airbag of claim 2 wherein the frangible strap further comprises at least one row of perforations that extends across the width of the frangible strap to allow the frangible strap to eventually rupture thereby allowing full inflation of the central portion.

4. The curtain airbag of claim 1 wherein the frangible restraining strap includes two folds therein, one side of a first fold being attached to an adjacent side of a second fold, the first fold incorporating a series of perforations.

5. The curtain airbag of claim 4 wherein upon deployment of the airbag the first fold becomes detached from the second fold and the frangible restraining strap becomes an enlarged diameter loop.

6. The curtain airbag of claim 1 wherein the frangible restraining strap is formed from at least one strip of plastics tape.

7. The curtain airbag of claim 1 wherein the central inflatable portion and the at least one elongate portion are enclosed in a frangible cover and the frangible restraining strap is secured external to the cover.

8. The curtain airbag of claim 1 wherein the at least one elongate portion comprises a pair of inflatable elongate portions extending adjacent the central portion.

9. The curtain airbag of claim 1 wherein the at least one elongate portion has a diameter less than a diameter of the central portion.

10. A curtain airbag comprising:
    a central inflatable portion in communication with an inflator for producing inflating gas on deployment of the airbag,
    at least one inflatable elongate portion extending adjacent the central inflatable portion; and
    a frangible restraining strap secured around the central inflatable portion, the restraining strap having two folds, one side of a first fold attached to an adjacent side of a second fold, the first fold incorporating a series of perforations;
    wherein the frangible restraining strap delays inflation of the central portion by deflecting the inflating gas into the at least one elongate portion, and the first and second folds permit a two-stage inflation of the central portion.

11. The curtain airbag of claim 10 wherein the at least one elongate portion comprises a pair of inflatable elongate portions extending adjacent the central portion.

12. The curtain airbag of claim 10 wherein the frangible restraining strap is formed from at least one strip of plastics tape.

13. The curtain airbag of claim 10 wherein the central inflatable portion and the at least one elongate portion are enclosed in a frangible cover and the frangible restraining strap is secured external to the cover.

14. The curtain airbag of claim 10 wherein the first fold further comprises at least one row of perforations that extends across the width of the frangible strap to allow the frangible strap to eventually rupture thereby allowing full inflation of the central portion.

15. The curtain airbag of claim 10 wherein upon deployment of the airbag the first fold becomes detached from the second fold and the frangible restraining strap becomes an enlarged diameter loop.

16. A curtain airbag comprising:
- a central inflatable portion in communication with an inflator for producing an inflating gas upon deployment of the airbag, at least one inflatable elongate portion extending adjacent the central inflatable portion; and
- a frangible restraining strap having a plurality of rows of perforations, wherein at least some of the rows are configured with the number of perforations increasing from one row to the next;
- wherein the frangible restraining strap delays inflation of the central portion by deflecting the inflating gas into the at least one elongate portion, and the configuration of rows of perforations allows greater expansion in a preferred direction.

17. The curtain airbag of claim 16 wherein the central inflatable portion and the at least one elongate portion are enclosed in a frangible cover and the frangible restraining strap is secured external to the cover.

18. The curtain airbag of claim 16 wherein the frangible strap further comprises at least one row of perforations that extends across the width of the frangible strap to allow the frangible strap to eventually rupture thereby allowing full inflation of the central portion.

19. The curtain airbag of claim 16 wherein the at least one elongate portion comprises a pair of inflatable elongate portions extending adjacent the central portion.

20. The curtain airbag of claim 16 wherein the at least one elongate portion has a diameter less than a diameter of the central portion.

* * * * *